(No Model.)

W. S. WHITING.
HOOK.

No. 456,786.        Patented July 28, 1891.

WITNESSES:
P. H. Chagle
L. Douville

INVENTOR
William S. Whiting
BY
Joshua Wiesenheim
ATTORNEY.

UNITED STATES PATENT OFFICE.

WILLIAM S. WHITING, OF CAMDEN, NEW JERSEY, ASSIGNOR TO THOMAS DE Q. RICHARDSON, FRANK E. DE LONG, AND CHARLES F. DE LONG, ALL OF PHILADELPHIA, PENNSYLVANIA.

HOOK.

SPECIFICATION forming part of Letters Patent No. 456,786, dated July 28, 1891.

Application filed March 13, 1891. Serial No. 384,943. (No model.)

*To all whom it may concern:*

Be it known that I, WILLIAM S. WHITING, a citizen of the United States, residing in the city and county of Camden, State of New Jersey, have invented a new and useful Improvement in Garment-Hooks, which improvement is fully set forth in the following specification and accompanying drawings.

My invention consists of a garment-hook formed of a shank and hook proper, said shank having one of its parts bent into a jaw which projects toward the hook proper, so as to close the space between the shank and hook proper, thus providing an inexpensive and practical device for the purpose intended.

It also consists of the novel construction of the fastening-eyes, whereby they possess increased strength and are prevented from closing on each other.

Figure 1:
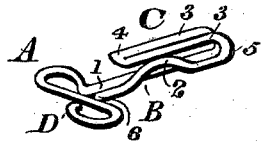
Figure 2:
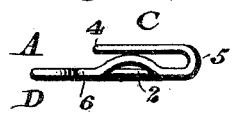
Figure 3:
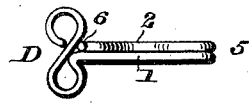

Figure 1 represents a perspective view of a garment-hook embodying my invention. Figs. 2 and 3 represent side elevations thereof.

Similar letters and numerals of reference indicate corresponding parts in the several figures.

Referring to the drawings, A designates a garment-hook more particularly designed for use with an eye of the order of a hook and eye, the same consisting of the shank B, hook proper C, and securing-eyes D. The shank B consists of the piece 1 and the tongue or jaw 2, which are placed side by side, said jaw being formed by bending out the material of which it is formed.

The hook proper C consists of the two pieces 3, placed side by side and united at the termination 4 of the hook, said pieces also joining the piece 1 and jaw 2, respectively, at the bends 5, it being noticed that the jaw closes against or toward one of the pieces 3 of the hook proper.

It will be seen that when an eye is presented to the hook and pressed against the jaw 2 the latter moves from the respective piece 3, thus opening the space between the shank and hook proper, so that the eye may be connected with the hook, said jaw then closing, whereby the eye is locked in position, it being evident that when superior power is applied to the eye in order to remove the same the jaw is pressed so as to open, thus permitting the outward passage of the eye from the hook.

The eyes D are continuous of the piece 1 of the shank and continuous of each other, by which construction they are prevented from closing on each other.

The hook will be found to be of a simple and inexpensive construction. It is made of few parts and obviates the use of a third piece heretofore in the shank of hooks of the class, as well as to permit the pieces 3 of the hook proper to be placed closely together, as in the old style of hooks.

It is evident that the hook is formed, preferably, of a single or continuous piece of wire.

Having thus described my invention, what I claim as new, and desire to secure by Letters Patent, is—

1. A garment-hook consisting of a piece of wire doubled upon itself and formed with a shank and a hook proper continuous of each other, one side of the shank being straight and the other side formed with a vertical bend engaging said hook proper, the free end of the straight portion of said shank being bent to form double eyes, substantially as described.

2. A garment-hook consisting of a shank, a hook proper, and securing-eyes, said shank consisting of the piece 1 and tongue 2, the hook proper being formed of the united pieces 3, connected with the piece 1 and tongue 2 at the bend 5, and the eyes being connections of the piece 1 and of each other, said parts being combined substantially as described.

WILLIAM S. WHITING.

Witnesses:
HARRY J. KNOLL,
M. H. BRENNAN.